(12) United States Patent
O'Neal (10) Patent No.: US 9,131,303 B2
(45) Date of Patent: Sep. 8, 2015

(54) VEHICLE AUDIO STRUCTURE

(71) Applicant: Nissan North America, Inc., Franklin, TN (US)

(72) Inventor: Kenneth Brian O'Neal, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 124 days.

(21) Appl. No.: 14/106,398

(22) Filed: Dec. 13, 2013

(65) Prior Publication Data

US 2015/0172799 A1 Jun. 18, 2015

(51) Int. Cl.
| | |
|---|---|
| H04R 1/02 | (2006.01) |
| B60N 2/44 | (2006.01) |
| B60R 11/02 | (2006.01) |
| H04R 1/28 | (2006.01) |
| B60R 11/00 | (2006.01) |

(52) U.S. Cl.
CPC ............ *H04R 1/025* (2013.01); *B60N 2/44* (2013.01); *B60R 11/0217* (2013.01); *H04R 1/2811* (2013.01); *B60R 2011/0012* (2013.01); *H04R 2499/13* (2013.01)

(58) Field of Classification Search
CPC .......................... B60R 1/0217; H04R 2499/13
USPC .......................................................... 381/389
See application file for complete search history.

(56) References Cited

U.S. PATENT DOCUMENTS

| | | | |
|---|---|---|---|
| 3,882,962 A | 5/1975 | Ripple | |
| 4,056,165 A | 11/1977 | Okamoto et al. | |
| 5,193,118 A | 3/1993 | Latham-Brown et al. | |
| 5,197,103 A | 3/1993 | Hayakawa | |
| 5,218,175 A | 6/1993 | Scarlata | |
| 5,398,992 A | 3/1995 | Daniels | |
| 5,618,178 A * | 4/1997 | Copperman et al. | 434/62 |
| 5,850,458 A * | 12/1998 | Tomisawa et al. | 381/71.4 |
| 6,324,294 B1 | 11/2001 | Azima et al. | |
| 6,493,455 B1 | 12/2002 | Tracy | |
| 6,801,635 B1 * | 10/2004 | Minami et al. | 381/406 |
| 6,868,937 B2 | 3/2005 | Cass | |
| 7,477,755 B2 | 1/2009 | Saiki et al. | |
| 7,724,915 B2 | 5/2010 | Matsumura et al. | |
| 7,764,807 B2 | 7/2010 | Roemer et al. | |

(Continued)

FOREIGN PATENT DOCUMENTS

| | | |
|---|---|---|
| DE | 102008015490 A1 | 10/2009 |
| DE | 102011105474 A1 | 12/2012 |

(Continued)

*Primary Examiner* — Simon King
(74) *Attorney, Agent, or Firm* — Global IP Counselors, LLP (57) ABSTRACT

A vehicle audio structure includes a seat assembly mounted to a vehicle floor at a plurality of mounting locations, the seat assembly having a seat bottom spaced apart from the vehicle floor. The seat bottom has a bottom surface with a partially confined area defined between the vehicle floor and the bottom surface. An enclosure structure is located within the partially confined area under the seat assembly. The enclosure structure has an upper wall located adjacent to the bottom surface of the seat bottom, a first bottom wall section, a second bottom wall section, a third bottom wall section and a plurality of side wall sections that define an enclosed space within the enclosure structure. The first bottom wall section, the second bottom wall section and the third bottom wall section are spaced apart from the upper wall by differing vertical distances.

20 Claims, 7 Drawing Sheets

(56) References Cited

U.S. PATENT DOCUMENTS

| | | |
|---|---|---|
| 7,953,240 B2 | 5/2011 | Matsumura et al. |
| 8,009,839 B2 | 8/2011 | Hagen |
| 8,295,535 B2 | 10/2012 | Tracy |
| 8,469,447 B2 | 6/2013 | Baker |
| 2003/0183444 A1* | 10/2003 | Cass ............................ 181/152 |
| 2005/0111673 A1* | 5/2005 | Rosen et al. ................... 381/89 |
| 2009/0067657 A1 | 3/2009 | Yasushi et al. |
| 2011/0216933 A1* | 9/2011 | Lan ............................... 381/386 |
| 2011/0280432 A1 | 11/2011 | Tracy |

FOREIGN PATENT DOCUMENTS

| | | |
|---|---|---|
| EP | 0904985 A1 | 3/1999 |
| EP | 1266799 A1 | 12/2002 |
| EP | 1793646 A2 | 6/2007 |
| JP | 04-223697 A | 8/1992 |
| JP | 10-291443 A | 11/1998 |
| JP | 2005-323025 A | 11/2005 |
| WO | 94-10880 A1 | 5/1994 |
| WO | 03-007650 A1 | 1/2003 |

* cited by examiner

VEHICLE AUDIO STRUCTURE

BACKGROUND

1. Field of the Invention

The present invention generally relates to a vehicle audio structure. More specifically, the present invention relates to an audio enclosure located between an underside of a seat bottom and a vehicle floor.

2. Background Information

Vehicle audio systems are installed within a passenger compartment of a vehicle in order to provide a desired audio quality that enhances the driving experience. Many vehicle audio systems include a sub-woofer speaker enclosure that outputs a specific range of low end frequencies in order to provide the desired audio quality within the passenger compartment. The audio quality from a sub-woofer speaker enclosure is dependent upon the internal volume of the enclosure structure. The optimal internal volume of the sub-woofer enclosure is determined based upon a number of well-known factors, such as, for example, the desired frequency range output, the audio driver output characteristics, and the volume of the passenger compartment of the vehicle. However, as vehicles become more fuel efficient and more compact, there is less and less space within the passenger compartment to accommodate a sub-woofer speaker enclosure having a desired internal volume.

SUMMARY

One object of the disclosure is to provide a vehicle passenger compartment with a sub-woofer speaker enclosure that maximizes the internal volume of the sub-woofer speaker enclosure without using valuable space within the vehicle passenger compartment.

Another object of the disclosure is to provide a sub-woofer speaker enclosure with an internal volume such that the audio frequency output of the sub-woofer speaker enclosure is optimized.

In view of the state of the known technology, one aspect of the disclosure is to provide a vehicle audio structure with a vehicle floor, a seat assembly, an enclosure structure and an audio driver. The vehicle floor has a plurality of mounting locations. The seat assembly is mounted to the floor at the plurality of mounting locations. The seat assembly has a seat bottom spaced apart from the vehicle floor. The seat bottom has a seating surface and a bottom surface opposite the seating surface with a partially confined area defined between the vehicle floor and the bottom surface. The enclosure structure is located within the partially confined area under the seat assembly. The enclosure structure has an upper wall located adjacent to the bottom surface of the seat bottom, a first bottom wall section, a second bottom wall section, a third bottom wall section and a plurality of side wall sections that define an enclosed space within the enclosure structure. The first bottom wall section and the upper wall are spaced apart by a first vertical distance. The second bottom wall section and the upper wall are spaced apart by a second vertical distance. The third bottom wall section and the upper wall are spaced apart from one another by a third vertical distance. The first vertical distance is greater than both the second and third vertical distances. The third vertical distance is greater than the second vertical distance. The second bottom wall section has an interior surface and an exterior surface with an audio driver opening extending from the interior surface to the exterior surface. The audio driver is mounted to the first bottom wall section covering the driver opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
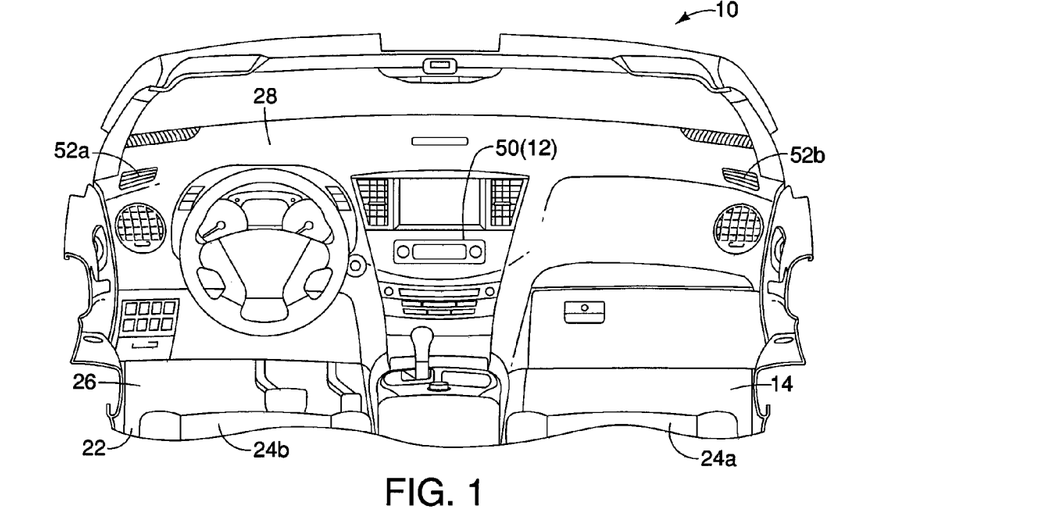
FIG. 1 is a plan view of a passenger compartment of a vehicle showing a floor, an instrument panel that includes portions of an audio system and seat assemblies in accordance with a first embodiment.

Referring initially to FIG. 1, a vehicle 10 is illustrated in accordance with a first embodiment. The vehicle 10 includes an audio system 12 (FIG. 2) installed to specific areas within a passenger compartment 14 of the vehicle 10. The audio system 12 includes an enclosure structure 20. In the depicted embodiment, the enclosure structure 20 is a sub-woofer enclosure structure. The enclosure structure 20 has a predetermined internal volume that is optimized to output a specific range of audio frequencies. The internal volume of the enclosure structure 20 is also maximized in such a way that it takes up a minimal amount of space within the passenger compartment 14 of the vehicle 10, as is described in greater detail below.

Prior to describing the enclosure structure 20, brief descriptions of the vehicle 10 and the audio system 12 are provided below.

Figure 3:
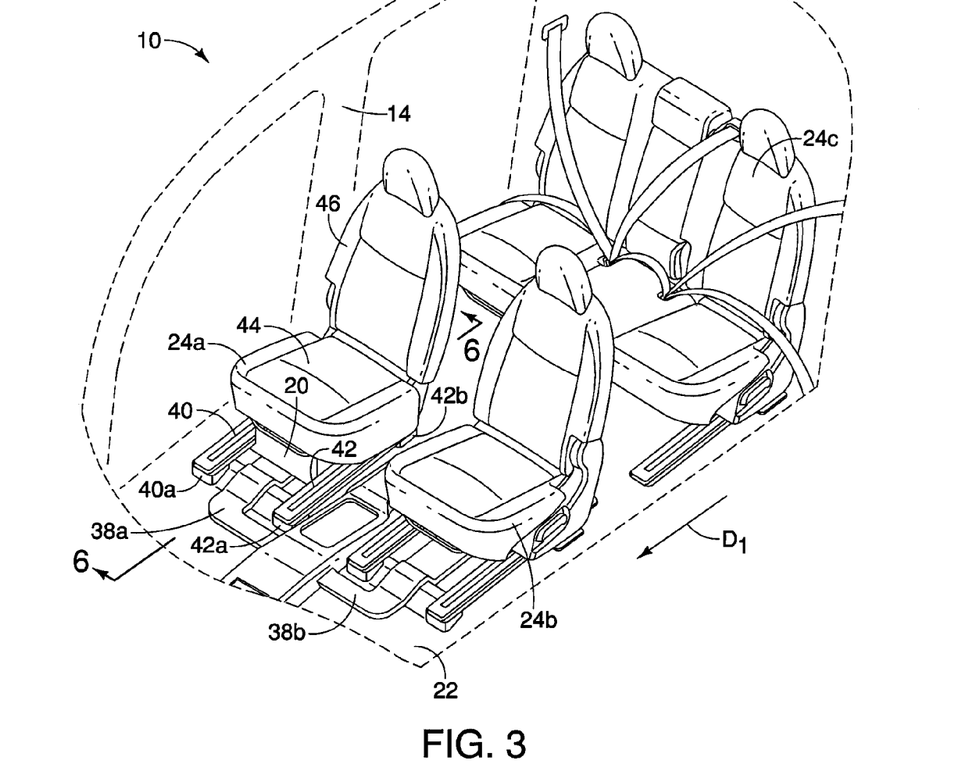
FIG. 3 is a perspective view of the passenger compartment showing the floor, the seat assemblies and the enclosure structure located between the floor and one of the seat assemblies in accordance with the first embodiment.

As shown in FIGS. 1 and 3, the vehicle 10 includes, among other things, a floor 22, a seat assembly 24a, a seat assembly 24b, a seat assembly 24c (FIG. 3), a dash wall 26 (FIG. 1), an instrument panel assembly 28 (FIG. 1) and the audio system 12. As shown in FIG. 1, the dash wall 26 and the floor 22 at least partially define the passenger compartment 14. More specifically, the floor 22 defines a lower boundary of the passenger compartment 14 and the dash wall 26 defines a forward boundary of the passenger compartment 14 relative to a vehicle longitudinal direction $D_1$.

Figure 4:
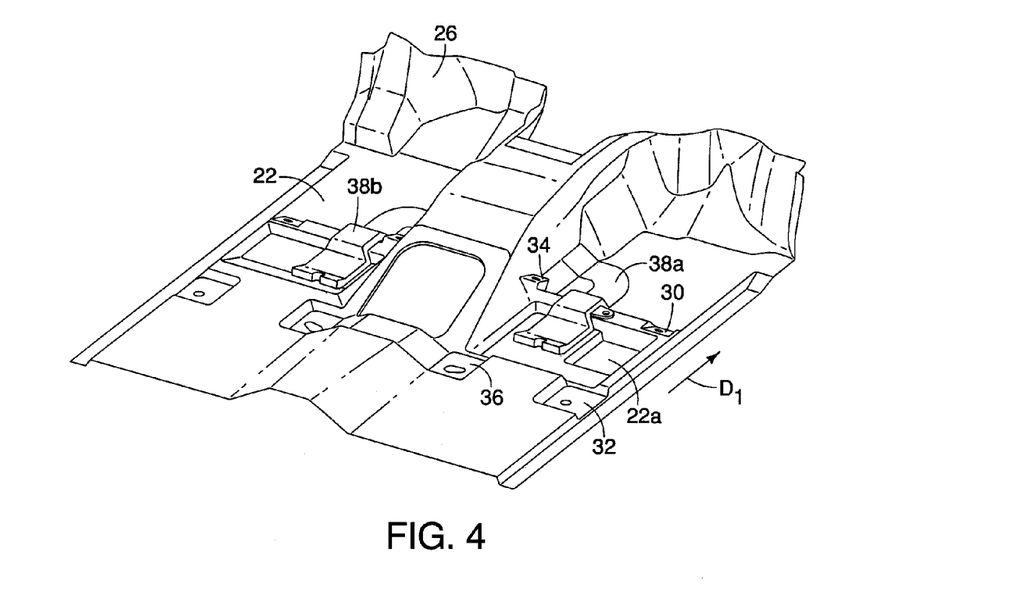
FIG. 4 is a perspective view of the floor of the passenger compartment with the seats and the enclosure structure removed in accordance with the first embodiment.
Figure 5:
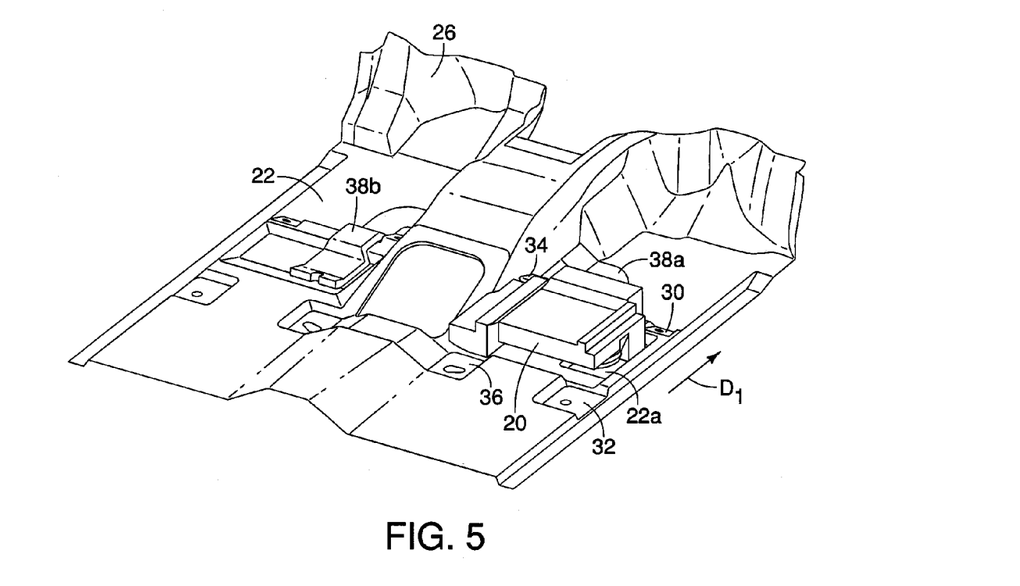
FIG. 5 is another perspective view of the floor similar to FIG. 4, showing the enclosure structure installed in accordance with the first embodiment.

As shown in FIGS. 4 and 5, the floor 22 is fixedly attached to the dash wall 26 in a conventional manner such that the floor 22 extends rearward from the dash wall 26 relative to the vehicle longitudinal direction $D_1$. As shown in FIG. 4, the floor 22 includes at least a first mounting location 30, a second mounting location 32, a third mounting location 34 and a fourth mounting location 36 that are spaced apart from one another. The floor 22 also includes ducts 38a and 38b that overlay sections of the floor 22. As is described further below, the ducts 38a and 38b extend under the seat assemblies 24a and 24b, respectively. The ducts 38a and 38b are part of a heating/ventilation/air conditioning system or HVAC system within the vehicle 10. The HVAC system is concealed beneath sections of the dash wall 26 and/or sections of the instrument panel assembly 28 in a conventional manner. However, the rear ends of each of the ducts 38a and 38b have exposed openings that provide conditioned air to areas rearward of the seat assemblies 24a and 24b. Since HVAC systems and HVAC ducts are conventional components of a vehicle, further description is omitted for the sake of brevity.

The floor 22 also includes a concaved area 22a located adjacent to the duct 38a, rearward of the first mounting location 30 and forward of the second mounting location 32. The concaved area 22a is an optional feature that is located beneath the seat assembly 24a, with the seat assembly 24a installed to the first, second, third and fourth mounting locations 30, 32, 34 and 36. The concaved area 22a is a portion of the floor 22 with a surface that is lower that the remainder of the floor 22.

In the depicted embodiments as shown in FIG. 3, the seat assembly 24a is a passenger seat, the seat assembly 24b is a driver's seat and the seat assembly 24c is a rear seat located rearward of the passenger seat 24a and the driver's seat 24b. The enclosure structure 20 can be mounted under any one of the seat assemblies 24a, 24b and 24c. However, in the depicted embodiment, the enclosure structure 20 is installed between the floor 22 and the seat assembly 24a. Therefore the description below focuses on the seat assembly 24a. However, it should be understood from the drawings and the description herein that the description of the seat assembly 24a applies to the seat assemblies 24b and 24c. It should also be understood from the drawings and the description herein that the enclosure structure 20 can be installed beneath any one of the seat assemblies 24a, 24b and 24c.

The seat assembly 24a includes parallel support tracks 40 and 42, a seat bottom 44 and seat back 46. The support track 40 includes mounting portions 40a and 40b, and the support track 42 includes mounting portions 42a and 42b. The mounting portions 40a, 40b, 42a and 42b are fixedly attached to the mounting locations 30, 32, 34 and 36, respectively of the floor 22 by, for example, removable mechanical fasteners (not shown).

The seat bottom 44 is mounted to the support tracks 40 and 42 such that the position of the seat bottom 44 can be adjusted along the length of the support tracks 40 and 42 in a conventional manner. In other words, the distance between the dash wall 26 and the seat bottom 44 can be changed by sliding the seat bottom 44 to differing positions along the support tracks 40 and 42. The seat bottom 44 includes a positioning mechanism (not shown) that releasably locks the seat bottom 44 at any one of the differing positions along the support tracks 40 and 42 in a conventional manner. Since the support tracks 40 and 42 and the positioning mechanism (not shown) of the seat bottom 44 are conventional components of seat assemblies, further description is omitted for the sake of brevity.

Figure 6:
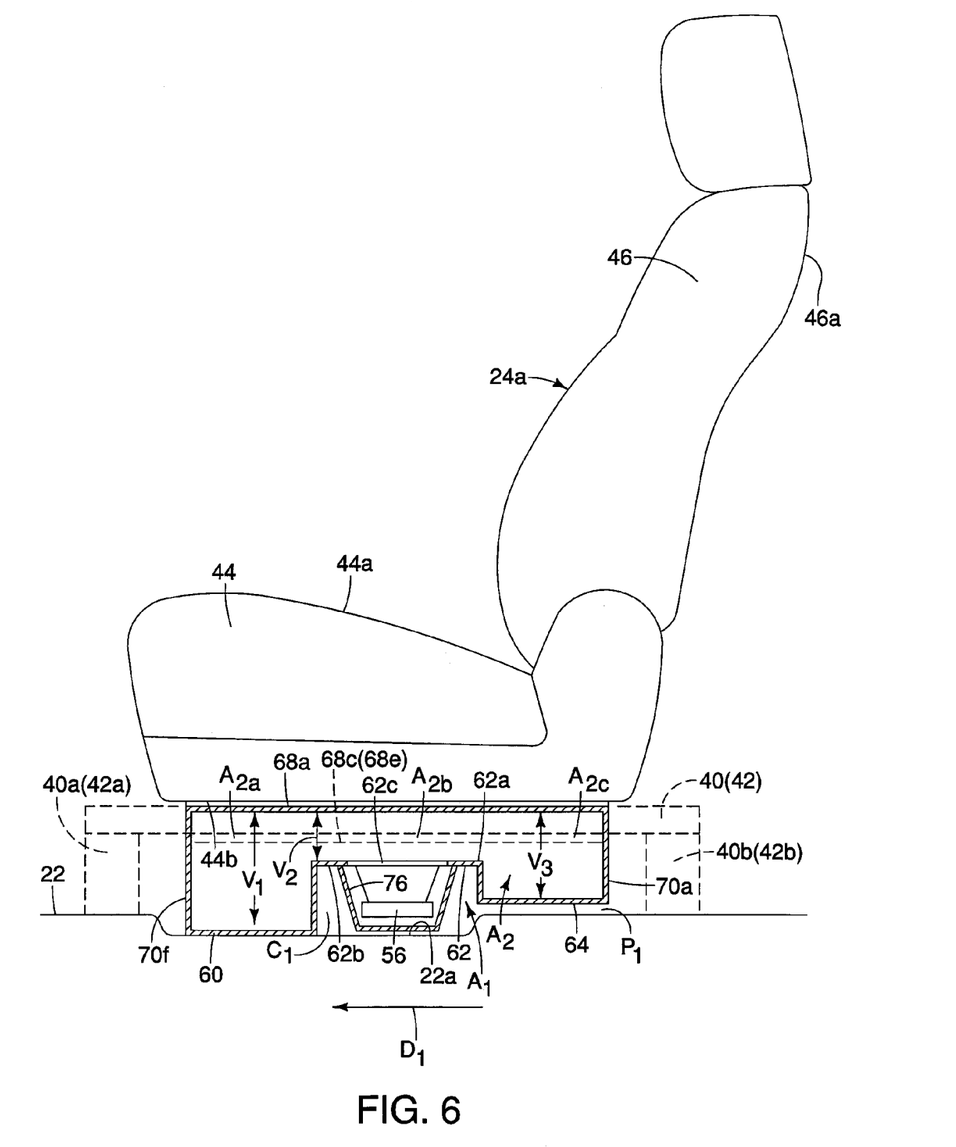
FIG. 6 is a side schematic view of the floor and the seat assembly with the enclosure structure installed between a bottom surface of the seat assembly and the floor, showing the enclosure structure in cross-section taken along the line 6-6 in FIG. 3, in accordance with the first embodiment.

As shown in FIGS. 3 and 6, the seat bottom 44 is spaced apart from the floor 22. As shown in FIG. 6, the seat bottom 44 has a seating surface 44a and a bottom surface 44b opposite the seating surface 44a. A partially confined area $A_1$ is defined between the floor 22 and the bottom surface 44b.

The seat back 46 of the seat assembly 24a is supported to the seat bottom 44 for movement between an upright orientation and an inclined orientation in a conventional manner. The seat back 46 is shown in the upright orientation or seating orientation in FIGS. 3 and 6. As shown in FIG. 6, a rearward most surface of the enclosure structure 20 is positioned forward in the vehicle longitudinal direction $D_1$ of a rearmost portion 46a of the seat back 46 with the seat back 46 in the upright orientation (seating orientation) and with the seat assembly 24a in a forward most location relative to the support tracks 40 and 42.

As shown in FIG. 1, the instrument panel assembly 28 is fixedly mounted within the passenger compartment 14 of the vehicle 10 covering a portion of the dash wall 26. The instrument panel assembly 28 includes HVAC system controls and a portion of the audio system 12, as described below.

Figure 2:
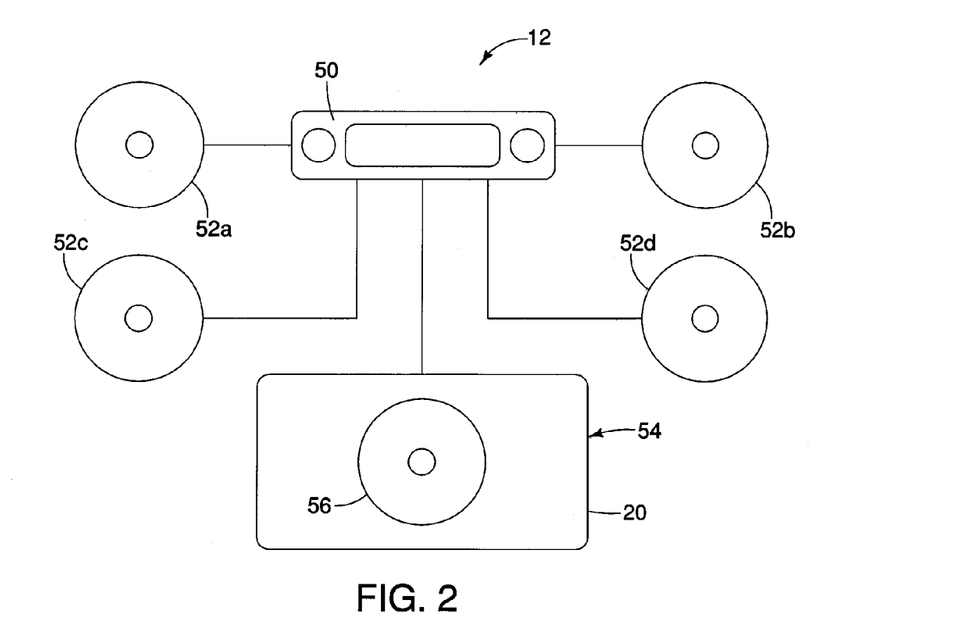
FIG. 2 is a schematic view of the audio system of the vehicle showing a control unit, speakers and a sub-woofer having an audio driver and an enclosure structure in accordance with a first embodiment.

As shown in FIG. 2, the audio system 12 includes a control unit 50, speakers 52a, 52b, 52c and 52d and a sub-woofer 54. The control unit 50, speakers 52a and 52b are installed at various locations of the instrument panel 28 in a conventional manner, as shown in FIG. 1. The control unit 50 includes, for example, a media player, an amplifier, audio controls, radio, and other conventional features of a control unit of an audio system. Since control units of audio systems are conventional components, further description is omitted for the sake of brevity.

The speakers 52c and 52d can be installed within opposite side doors (not shown) of the vehicle 10, or at other locations within the vehicle 10. Further, it should be understood from the drawings and the description herein, that the audio system 12 can include any of a variety of combinations of speakers, and is not limited to the depicted four speakers 52a-52d, shown in FIG. 2. The audio system 12 can include between 2 to 12 speakers, or more speakers, if desired and/or required and the sub-woofer 54.

The sub-woofer 54 includes the enclosure structure 20 and an audio driver 56 mounted within the enclosure structure 20, as described in greater detail below.

As shown in FIG. 6, the enclosure structure 20 is located within the partially confined area $A_1$ between the bottom surface 44b of the seat assembly 24a and the floor 22. The enclosure structure 20 is dimensioned and shaped to maximize the inner volume of the spaces within the enclosure structure 20 and utilize as much space as possible between the floor 22 and the bottom surface 44b of the seat assembly 24a. The enclosure structure 20 also utilizes space beneath the support tracks 40 and 42, as described below.

The enclosure structure 20 is contoured and shaped to maximize usage of the volume of the partially confined area $A_1$ defined between the floor 22 and the bottom surface 44b of the seat assembly 24a. In order to take advantage of a maximum volume of the partially confined area $A_1$, the enclosure structure 20 has a plurality of surfaces and projections that are dimensioned and shaped to fit against the floor 22 and along the support tracks 40 and 42 and the bottom surface 44b of the seat bottom 44 of the seat assembly 24a.

Figure 7:
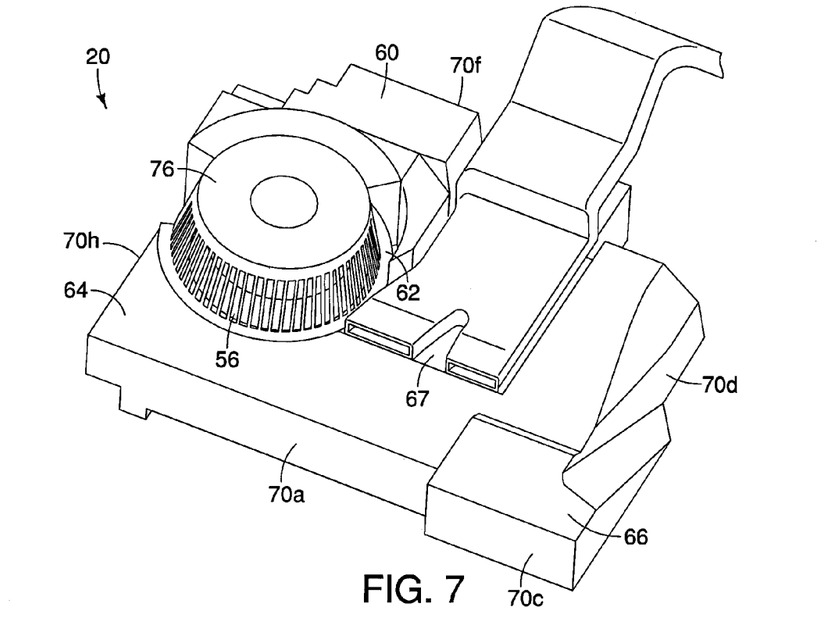
FIG. 7 is a bottom view of the enclosure structure shown removed from the vehicle in accordance with the first embodiment.
Figure 8:
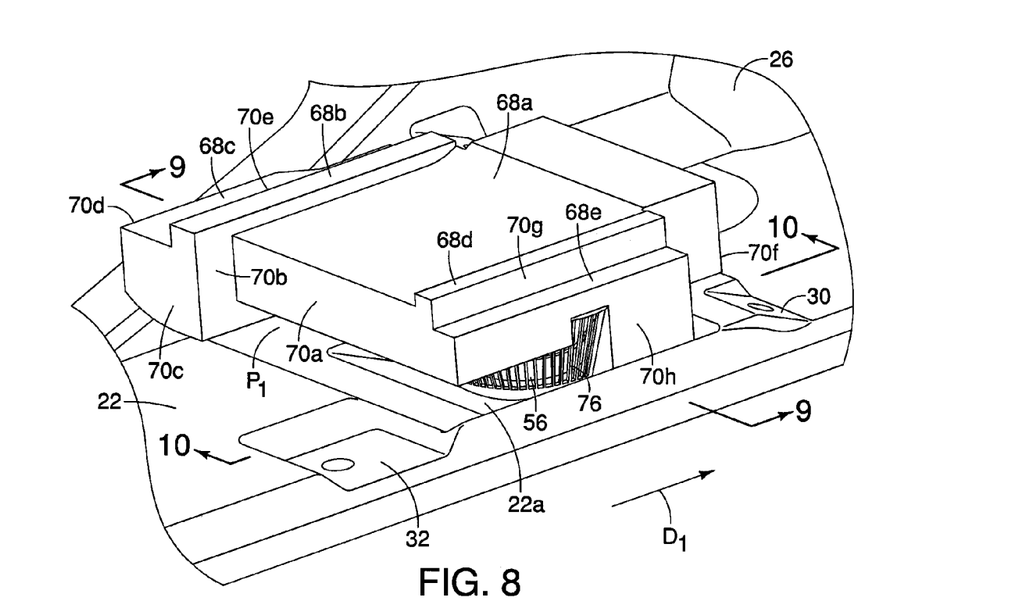
FIG. 8 is a perspective view of a portion of the floor with the seat assembly removed showing the enclosure structure in accordance with the first embodiment.
Figure 9:
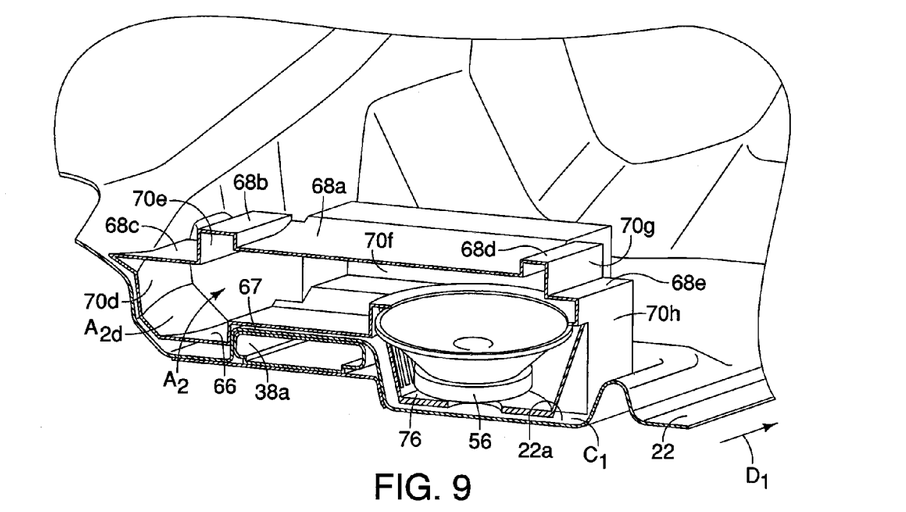
FIG. 9 is perspective cross-sectional view of the floor and the enclosure structure taken along the line 9-9 in FIG. 8 showing details of the internal space within the enclosure structure and the audio driver in accordance with the first embodiment.

As shown in FIG. 7, the enclosure structure 20 has at least a first bottom wall section 60, a second bottom wall section 62, a third bottom wall section 64, a fourth bottom wall section 66 and a fifth wall section 67. As shown in FIG. 8, the enclosure structure 20 has a main upper wall 68a, upper wall section 68b, upper wall section 68c, upper wall section 68d and an upper wall section 68e. As shown in FIG. 6, the main upper wall 68a is located adjacent to the bottom surface 44b of the seat bottom 44 of the seat assembly 24a. As shown in FIGS. 7-10, the enclosure structure 20 also includes a plurality of side wall sections, including side wall sections 70a, 70b, 70c, 70d, 70e, 70f, 70g and 70h. The first bottom wall section 60, the second bottom wall section 62, the third bottom wall section 64, the fourth bottom wall section 66, the upper wall sections 68a, 68b and 68c, and the side wall sections 70a-70h define an enclosed space $A_2$ within the enclosure structure 20. The fifth bottom wall section 67, is provided to accommodate the HVAC duct 38a, as shown in FIGS. 7 and 9.

As shown in FIG. 6, the first bottom wall section 60 and the main upper wall 68a are spaced apart by a first vertical distance $V_1$. The second bottom wall section 62 and the main upper wall 68a are spaced apart by a second vertical distance $V_2$. The third bottom wall section 64 and the main upper wall 68a are spaced apart by a third vertical distance $V_3$. The first vertical distance $V_1$ is greater than both the second and third vertical distances $V_2$ and $V_3$. The third vertical distance $V_3$ is greater than the second vertical distance $V_2$. Further, since there are a plurality of differing bottom wall sections and a plurality of upper wall sections of the enclosure structure 20, there is a plurality of corresponding vertical distances therebetween. For purposes of understanding the features of the enclosure structure 20, the second and third vertical distances $V_2$ and $V_3$ are identified and discussed herein. However, it should be understood from the drawings and the description herein that there are many walls that define the enclosure structure 20 that serve to maximize the internal volume, as described herein.

The second bottom wall section 62 has an interior surface 62a and an exterior surface 62b with an audio driver opening 62c extending from the interior surface 62a to the exterior surface 62b. As shown in FIG. 6, the audio driver 56 is installed to the exterior surface 62b, covering the audio driver opening 62c. The audio driver 56 is oriented such that the power section (the magnet) is located outside of the enclosed space $A_2$ of the enclosure structure 20 in order to maximize the volume of the enclosed space $A_2$ of the enclosure structure 20.

As is also shown in FIG. 6, the enclosure structure 20 defines a cavity $C_1$ between the second bottom wall section 62 and the vehicle floor 22. At least a majority of the audio driver 56 is located within the cavity $C_1$ outside the enclosed space $A_2$ of the enclosure structure 20. However, it should be understood from the drawings and the description herein that the audio driver 56 can be installed to the interior surface 62a of the second bottom wall section 62. However, if the audio driver 56 is installed to the interior surface 62a of the second bottom wall section 62, the power section (the magnet) is located outside of the enclosed space $A_2$ of the enclosure structure 20.

Figure 10:
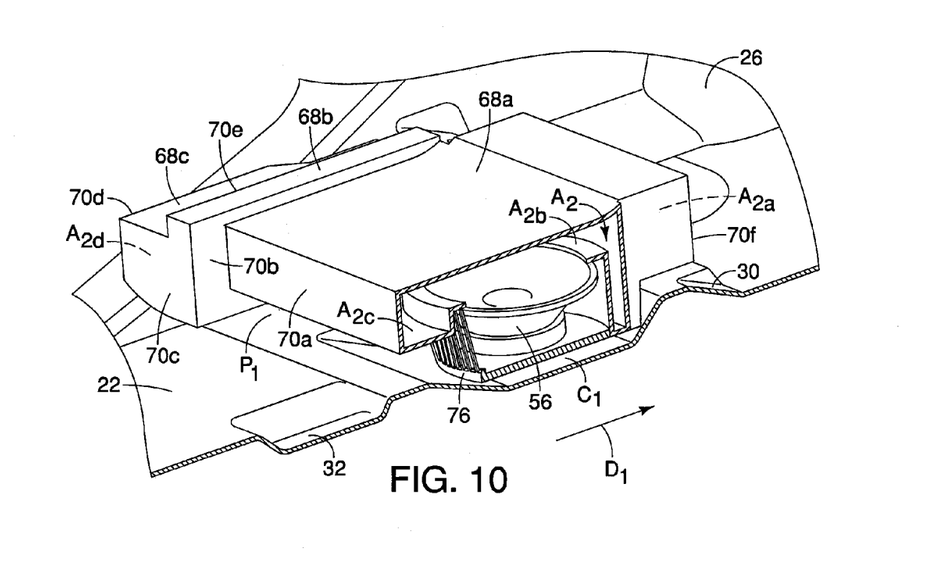
FIG. 10 is another perspective cross-sectional view of the floor and the enclosure structure taken along the line 10-10 in FIG. 8 showing further details of the internal space within the enclosure structure and the audio driver in accordance with the first embodiment.

As shown in FIGS. 6, 8 and 10, an air path $P_1$ is defined between the third bottom wall section 64 and the floor 22. The air path $P_1$ extends from the cavity $C_1$ to an area outside the partially confined area $A_1$ to an area behind the seat assembly 24a. Further, the air path $P_1$ is open to the area adjacent to the seat assembly 24c (the rear seat). The air path $P_1$ is an audio pathway between the audio driver 56 and the passenger compartment 14. In other words, the sound from the enclosure structure 20 travels from the audio driver 56 through the air path $P_1$ to the passenger compartment 14. The enclosed space $A_2$ of the enclosure structure 20 serves as an acoustic chamber for the audio driver 56 that enables the audio driver 56 to have an optimal audio output with a desired frequency range output.

As shown in FIGS. 7 and 9, the HVAC duct 38a is located below the fifth bottom wall section 67. The HVAC duct 38a is also open to the air path $P_1$, since the HVAC duct 38a extends from a location in front of the seat assembly 24a to a location under the seat assembly 24a, in order to provide conditioned air to the areas behind the seat assembly 24a. Hence, the HVAC duct 38a and the enclosure structure 20 (the audio driver 56) are open to the area behind the seat assembly 24a toward the seat assembly 24c such that the HVAC duct 38a provide conditioned air and the enclosure structure 20 (the audio driver 56) provides sound via the air path $P_1$. However, it should be understood from the drawings and the description herein, that the air path $P_1$ can be also be open to an area in front of the seat assembly 24a or to either side of the seat assembly 24a, depending upon the design of the vehicle and/or the arrangement of seats within the passenger compartment of the vehicle.

As shown in FIGS. 6-10, a guard member 76 can optionally be installed to the second bottom wall section 62, covering the audio driver 56. The guard member 76 is positioned within the cavity $C_1$ encompassing the audio driver 56 and protecting the audio driver 56 from articles within the passenger compartment 14 that might become lodged under the seat assembly 24a.

As shown in FIG. 6, the first bottom wall section 60 is located forward of the second bottom wall section 62 relative to the vehicle longitudinal direction $D_1$. The third bottom wall section 64 is located rearward of the first and second bottom wall sections 60 and 62 relative to the vehicle longitudinal direction $D_1$. Further, the first bottom wall section 60 extends along a portion of the floor 22 and the second and third bottom wall sections 62 and 64 are spaced apart from the floor 22.

As shown in FIG. 6, the first bottom wall section 60 and the main upper wall 68a define a first portion $A_2a$ of the enclosed space $A_2$. The second bottom wall section 62 and the main upper wall 68a define a second portion $A_2b$ of the enclosed space $A_2$. The third bottom wall section 64 and the main upper wall 68a define a third portion $A_{2c}$ of the enclosed space $A_2$. As shown in FIGS. 9-10, the fourth bottom wall section 66, the upper wall section 68b and the upper wall section 68c define a fourth portion $A_2d$ of the enclosed space $A_2$ that extends in the vehicle longitudinal direction $D_1$ adjacent the first, second and third portions $A_{2a}$, $A_{2b}$, and $A_{2c}$ of the enclosed space $A_2$.

As indicated in FIG. 6, the upper wall sections 68c and 68e are dimensioned such that the support tracks 40 and 42, respectively, extend above the upper wall sections 68c and 68e. In other words, the upper wall sections 68c and 68e are lower in a vertical direction relative to the main upper wall 68a, so that the enclosure structure 20 can fit under the support tracks 40 and 42, thereby taking advantage of space that would otherwise be empty.

Side wall sections 70e and 70g extend upward from the upper wall sections 68c and 68e, to the upper wall sections 68b and 68d, respectively. The upper wall sections 68b and 68d can be located above the main upper wall 68a, thereby maximizing the volume of the enclosure structure 20. Thus, with all of the various walls of the enclosure structure 20 extending into otherwise empty spaces between the floor 22 and the seat assembly 24a, the volume of the enclosed space $A_2$ of the enclosure structure 20 is maximized in order to ensure an appropriate audio response.

In particular, since the enclosure structure 20 is a sub-woofer, the volume of the enclosed space $A_2$ of the enclosure structure 20 can be calculated in a conventional manner in order to achieve a specific audio frequency range output. For example, sub-woofers typically output a frequency within a range of between 20 and 200 Hz. The necessary volume of the enclosed space $A_2$ of the enclosure structure 20 can be calculated based upon well-known equations in order to achieve the desired output frequency range. From such calculations, the need for the various portions of the enclosed space $A_2$ can be determined.

Second Embodiment

Figure 11:
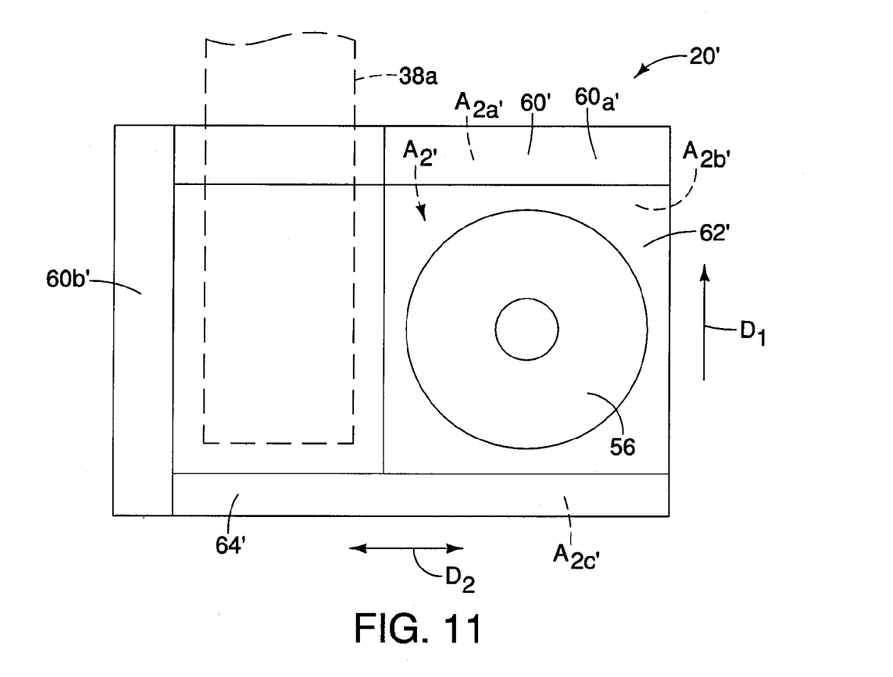
FIG. 11 is a bottom schematic view of the enclosure structure shown removed from the floor showing portions of the bottom surface of the enclosure structure in accordance with a second embodiment.

Referring now to FIG. 11, an enclosure structure 20' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the internal volume of the enclosure structure 20' is such that the bottom wall of the enclosure structure 20' is simplified, as compared to the first embodiment. For instance, in the second embodiment, a first bottom wall section 60' has an L-shape with a first portion 60a' of the L-shape extending in a vehicle lateral direction $D_2$ and a second portion 60b' extending in the vehicle longitudinal direction $D_1$. The first portion 60a' of the first bottom wall section 60' is adjacent to a second bottom wall section 62'. The second portion 60b' of the first bottom wall section 60' is adjacent to the second bottom wall section 62' and a third bottom wall section 64'. The upper wall section (not shown) can be uniformly flat such that a first, second and third portions $A_{2a}'$, $A_{2b}'$ and $A_{2c}'$ of the enclosed space $A_2'$ of the enclosure structure 20' provide a maximized overall internal volume, in a manner consistent with that described above with respect to the first embodiment. Although not visible, the second bottom wall section 62' of the enclosure structure 20' includes a speaker opening covered by the audio driver 56.

Further, the duct 38a extends under the enclosure structure 20', as shown in FIG. 11.

Third Embodiment

Figure 12:
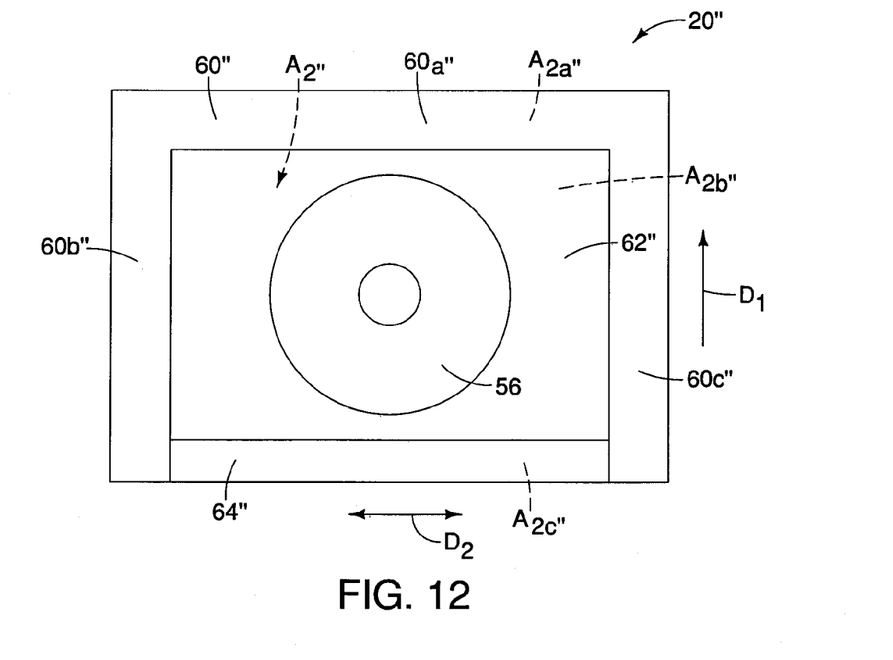
FIG. 12 is a bottom schematic view of an enclosure structure shown removed from the floor showing portions of a bottom surface of the enclosure structure in accordance with a third embodiment.

Referring now to FIG. 12, an enclosure structure 20" in accordance with a third embodiment will now be explained.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the internal volume of the enclosure structure 20" is such that the bottom wall of the enclosure structure 20" is simplified, as compared to the first embodiment, in that the duct 38a is not present. Therefore, the space that would otherwise be necessary to accommodate the duct 38a can be utilized to increase the volume within the enclosure structure 20".

For instance, in the third embodiment, a first bottom wall section 60" has a U-shape with a first portion 60a" of the U-shape extending in a vehicle lateral direction $D_2$. A second portion 60b" and a third portion 60c" extend in the vehicle longitudinal direction $D_1$ on opposite sides of a second bottom wall section 62" and a third bottom wall section 64" from opposite ends of the first portion 60a". The upper wall section (not shown) can be uniformly flat such that the first, second and third portions $A_{2a}''$, $A_{2b}''$ and $A_{2c}''$ of the enclosed space $A_2''$ of the enclosure structure 20" provide a maximized overall internal volume of the enclosed space $A_2''$ of the enclosure structure 20", in a manner consistent with that described above with respect to the first embodiment. Although not visible, the second bottom wall section 62" of the enclosure structure 20" includes a speaker opening covered by the audio driver 56.

The various portions of the vehicle 10 surrounding the enclosure structure 20 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle audio structure. Accordingly, these terms, as utilized to describe the present invention should be interpreted relative to a vehicle equipped with the vehicle audio structure.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle audio structure comprising
a vehicle floor having a plurality of mounting locations;
a seat assembly mounted to the vehicle floor at the plurality of mounting locations, the seat assembly having a seat bottom spaced apart from the vehicle floor, the seat bottom having a seating surface and a bottom surface opposite the seating surface with a partially confined area defined between the vehicle floor and the bottom surface;
an enclosure structure located within the partially confined area under the seat assembly, the enclosure structure having an upper wall located adjacent to the bottom surface of the seat bottom, a first bottom wall section, a second bottom wall section, a third bottom wall section and a plurality of side wall sections that define an enclosed space within the enclosure structure, the first bottom wall section and the upper wall being spaced apart by a first vertical distance, the second bottom wall section and the upper wall being spaced apart by a second vertical distance and the third bottom wall section and the upper wall being spaced apart by a third vertical distance, the first vertical distance being greater than both the second and third vertical distances, the third vertical distance being greater than the second vertical distance, the second bottom wall section having an interior surface and an exterior surface with an audio driver opening extending from the interior surface to the exterior surface; and
an audio driver mounted to the second bottom wall section covering the audio driver opening.

2. The vehicle audio structure according to claim 1, wherein
the audio driver is installed to the exterior surface of the second bottom wall section outside the enclosed space of the enclosure structure.

3. The vehicle audio structure according to claim 2, wherein
the audio driver faces the upper wall of the enclosure structure.

4. The vehicle audio structure according to claim 1, wherein
the enclosure structure defines a cavity between the second bottom wall section and the vehicle floor, with at least a majority of the audio driver being located within the cavity and outside the enclosed space of the enclosure structure.

5. The vehicle audio structure according to claim 4, wherein
the third bottom wall section and the vehicle floor define an air path that extends from the cavity to an area outside the partially confined area under the seat assembly.

6. The vehicle audio structure according to claim 5, further comprising
a second seat assembly attached to the vehicle floor proximate the seat assembly, with the air path extending from the audio driver to an area adjacent the second seat.

7. The vehicle audio structure according to claim 4, further comprising
a guard member positioned within the cavity and encompassing the audio driver.

8. The vehicle audio structure according to claim 1, wherein
the seat assembly includes a seat back supported to the seat bottom for movement between an upright orientation and an inclined orientation, and
a rearward most one of the side walls of the enclosure structure has a rear surface positioned forward in a vehicle longitudinal direction of a rearmost portion of the seat back.

9. The vehicle audio structure according to claim 1, wherein
the first bottom wall section is located forward of the second bottom wall section relative to a vehicle longitudinal direction.

10. The vehicle audio structure according to claim 1, wherein
the third bottom wall section is located rearward of the first and second bottom wall sections relative to a vehicle longitudinal direction.

11. The vehicle audio structure according to claim 1, wherein
the first bottom wall section extends adjacent to a portion of the vehicle floor and the second and third bottom wall sections are spaced apart from the vehicle floor.

12. The vehicle audio structure according to claim 1, wherein
the first bottom wall section and the upper wall define a first portion of the enclosed space.

13. The vehicle audio structure according to claim 12, wherein
the second bottom wall section and the upper wall define a second portion of the enclosed space, and
the third bottom wall section and the upper wall define a third portion of the enclosed space.

14. The vehicle audio structure according to claim 13, wherein
the enclosure structure includes a fourth bottom wall section spaced apart from the upper wall, the fourth bottom wall section and the upper wall defining a fourth portion of the enclosed space that extends in a vehicle longitudinal direction adjacent the first, second and third portions of the enclosed space.

15. The vehicle audio structure according to claim 1, wherein
the first bottom wall section has an L-shape with a first portion that extends in a vehicle lateral direction adjacent to the second bottom wall section and a second portion that extends in a vehicle longitudinal direction adjacent to the second bottom wall section.

16. The vehicle audio structure according to claim 1, wherein
the first bottom wall section has a U-shape with a first portion that extends in a vehicle longitudinal direction adjacent to a first side of the second bottom wall section, a second portion that extends in a vehicle lateral direction adjacent to a front side of the second bottom wall section and a third portion that extends in a vehicle longitudinal direction adjacent to a second side of the second bottom wall section.

17. The vehicle audio structure according to claim 16, wherein
the third bottom wall section extends in a vehicle lateral direction between the first and third portions of the first bottom wall section such that the first bottom wall section and the third bottom wall section encircle the second bottom wall section.

18. The vehicle audio structure according to claim 1, wherein
the plurality of mounting locations of the vehicle floor includes at least a first mounting location and a second mounting location spaced apart from one another,
the seat assembly includes at least one support track mounted to the first mounting location and to the second mounting location such that the partially confined area is further defined between the at least one support track and the vehicle floor, and
the upper wall of the enclosure structure includes a first section that extends under the at least one mounting track.

19. The vehicle audio structure according to claim 18, wherein
the plurality of mounting locations of the vehicle floor includes at least a third mounting location and a fourth mounting location spaced apart from one another,
the seat assembly includes a second support track mounted to the third mounting location and to the fourth mounting location such that the partially confined area is further defined between the second support track and the vehicle floor, and
the upper wall of the enclosure structure includes a second section that extends under the second mounting track.

20. The vehicle audio structure according to claim 1, wherein
the plurality of mounting locations of the vehicle floor includes a first mounting location, a second mounting location, a third mounting location and a fourth mounting location spaced apart from one another,
the seat assembly includes a first support track mounted to the first mounting location and to the second mounting location and a second support track mounted to the third mounting location and the fourth mounting location such that the partially confined area is further defined between the first support track and the vehicle floor, and the second support track and the vehicle floor, and
the upper wall of the enclosure structure includes a first section that extends under the first mounting track and a second section that extends under the second mounting track.

* * * * *